United States Patent [19]

Ray

[11] Patent Number: 5,029,878
[45] Date of Patent: Jul. 9, 1991

[54] ELASTOMERIC PUMP CASING SEAL

[75] Inventor: Leslie A. W. Ray, New South Wales, Australia

[73] Assignee: Warman International Limited, New South Wales, Australia

[21] Appl. No.: 275,310

[22] Filed: Nov. 23, 1988

[30] Foreign Application Priority Data

Nov. 24, 1987 [AU] Australia ............... PI5601

[51] Int. Cl.⁵ ............... F16J 15/10
[52] U.S. Cl. ............... 277/170; 277/189
[58] Field of Search ............... 277/168, 178, 179, 183, 277/205, 206 R, 207 A, 212 C, 237 R, 167.5, 170, 171, 214, 189; 415/108, 134; 417/900; 220/344, 357, 358; 123/195 C

[56] References Cited

U.S. PATENT DOCUMENTS

| | | | |
|---|---|---|---|
| 3,284,145 | 11/1966 | Bixby | 277/205 X |
| 3,467,395 | 9/1966 | Kan | 277/178 X |
| 3,620,556 | 11/1971 | Paddington | 277/179 X |
| 4,182,519 | 1/1980 | Wilson | 277/207 A |
| 4,298,206 | 11/1981 | Kojima | 277/207 A X |
| 4,311,317 | 1/1982 | Bartels | 277/207 A X |
| 4,347,033 | 8/1982 | Possell | 417/900 X |
| 4,396,355 | 8/1983 | Wilmot et al. | 417/900 X |
| 4,472,118 | 9/1984 | Schwing | 417/900 X |
| 4,501,432 | 2/1985 | Kuniyoshi et al. | 277/168 |
| 4,614,483 | 9/1986 | Hudelmaier | 417/900 X |
| 4,865,517 | 9/1989 | Beehler | 277/205 X |

Primary Examiner—William A. Cuchlinski, Jr.
Assistant Examiner—Scott Cummings
Attorney, Agent, or Firm—Amster, Rothstein & Ebenstein

[57] ABSTRACT

An elastomeric seal for joining together a casing part which mates within a recess in a second casing part and which locates both casing parts with respect to each other and forms a liquid tight seal therebetween. Preferably the seal is of a "J" or "L" shaped profile.

11 Claims, 3 Drawing Sheets

ELASTOMERIC PUMP CASING SEAL

The present invention relates to a method of sealing the casing joint or joints of a two or more piece casing of a centrifugal pump and in particular to such joints for centrifugal slurry pumps.

Because conventional slurry pumps are required to withstand abrasive conditions it is necessary that they are constructed of alloys of high hardness thus making machining of the parts expensive and difficult. To ensure correct alignment and sealing, it necessary that the casing joint of these pumps are machined to exact requirement. This, therefore, increases the cost in the production of such pumps.

Typical prior art methods for sealing such joints are shown in FIGS. 1 to 3.

FIG. 1 illustrates a "U" seal 4 which is located into a recess in the frame plate 1. The mating surfaces 14 and 15 of the volute casing 2 and the side liner 3, have to be machined to exact tolerances to ensure an accurate fit.

The "U" seal 4 is compressed against the outer surface of the volute casing 2 and side liner 3, on either side of the join, to provide the seal against the pumping medium travelling through an interface between the faces 14 and 15.

A further method of sealing is shown in FIG. 2 which utilises an "O" ring seal 5. The mating faces 16 and 17 respectively, or the volute casing 2 and side liner 3 are machined to provide a smooth sealing surface. A chamfered recess 18 is formed on the outer corner of the volute casing 2 or the side liner 3 into which is compressed the "O" ring 5.

In the sealing position the volute casing 2 and side liner 3 are locked together with the faces 16 and 17 in intimate contact. The "O" ring 5 is compressed in the recess 18 by the frame plate 1 and the surface 17 of the side liner 3 to form a seal against any pumping medium which travels through the interface of the faces 16 and 17.

A further prior method is shown in FIG. 3 utilising a "O" ring seal. In this method, the faces 19 and 20 are machined and the "V" ring 6 inserted therebetween. When the volute casing 2 and the side liner 3 are tightened together with the frame plate 1 the "V" ring 6 is compressed to provide a leak-free seal. It is essential that the surfaces 19 and 20 are accurately machine to ensure proper compression of the rubber to effect a leak-free seal.

The present invention seeks to eliminate or reduce the necessity of the accurate, close-tolerance machining required in the prior art method.

In one broad form the present invention provides an elastomeric casing seal which provides location between the mating parts of the casing as well as sealing between the casing parts.

Preferably, the seal has tapered faces which mate with tapered faces on at least one of the adjoining faces of the casing.

The present invention will now be described by way of example with reference to the accompanying drawings in which;

Figure 1:
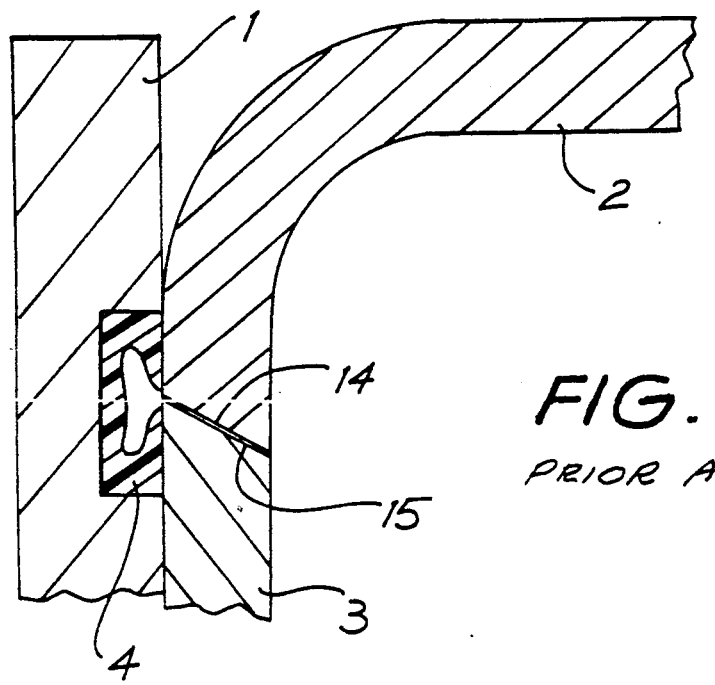
FIGS. 1-3 show the previously mentioned prior art sealing methods.
Figure 2:
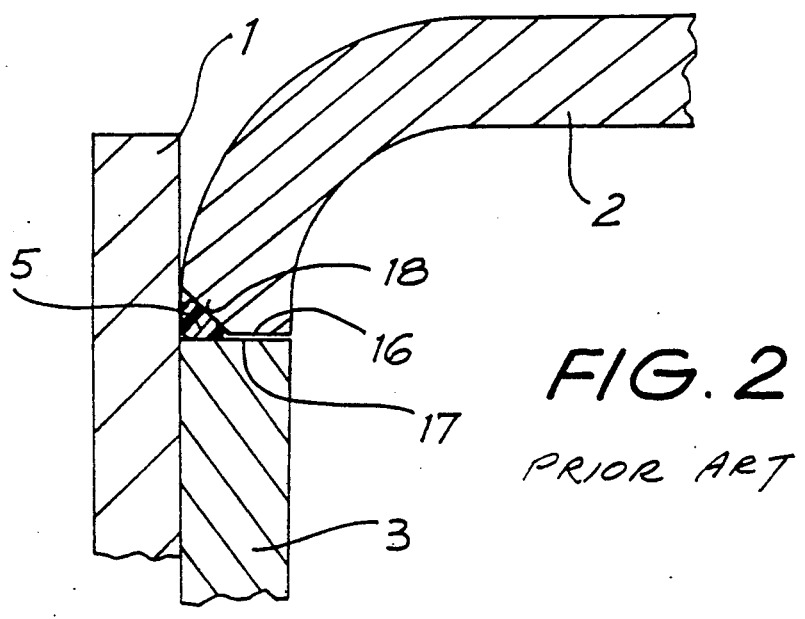
Figure 3:
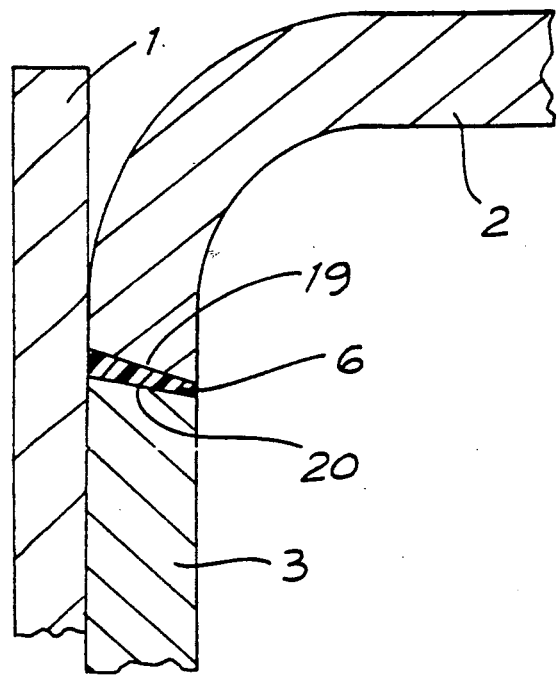
Figure 4:
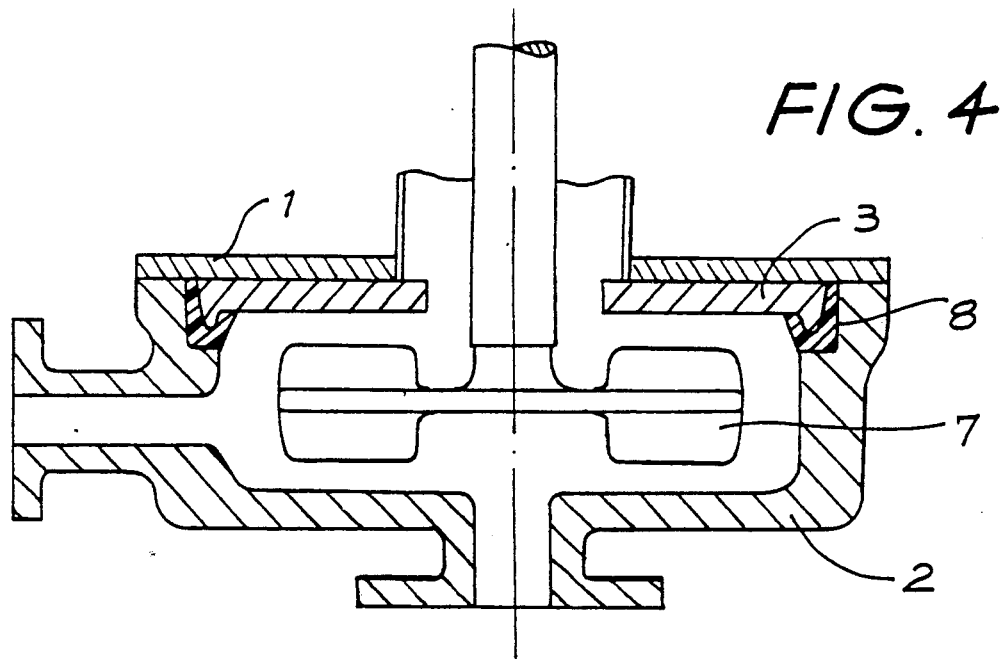
FIG. 4 shows a schematic cross-section view of the centrifugal slurry pump containing one embodiment of the present invention.

As shown in the figure 4, a seal 8 of "J" shaped cross-section is located in the recess on the volute casing 2 and locates the side liner 3 and seals between the side liner 3 and the volute casing 2, with frame plate 1 attached to the side liner 3 and the volute casing 2 to form the slurry pump casing in which the impeller 7 rotates.

Figure 5:
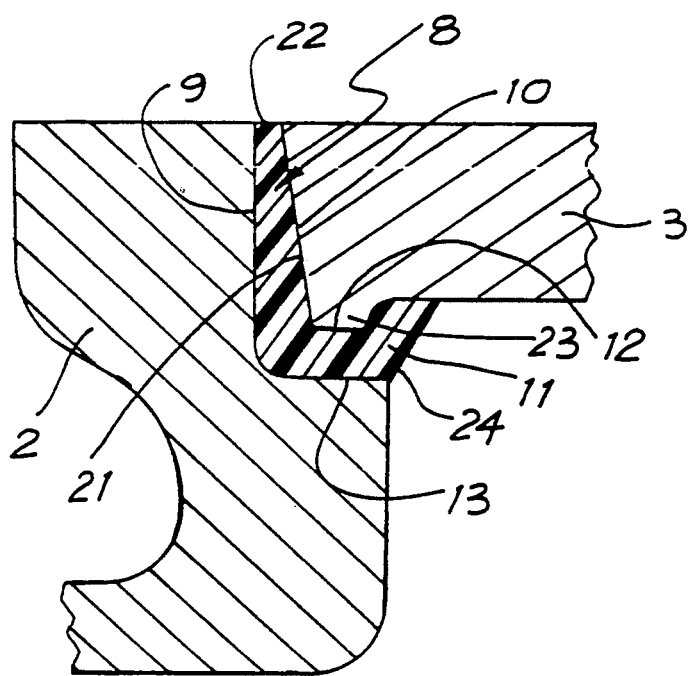
FIG. 5 shows a detailed sectional view of the seal shown in FIG. 4.

A detailed view of the seal 8 is shown in FIG. 5. The face 10 of the side liner 3 is tapered. This taper mates with the taper on the inner face 21 of the leg 22 of the seal 8, thus radially locating the side liner 3 in relation to the volute casing 2. The elastomeric material of the seal 8 is compressed between the face 12 of the side liner 3 and the face 13 of the volute casing 2 in the axial direction to provide a liquid-tight joint between faces 12 and 13. The leg 11 of the "J" of the seal 8 engage around the annular portion 23 of the side liner 3 to positively locate the seal 8 to prevent extrusion of the seal from the joint under pressure. The face 24 of the leg 11 is tapered to prevent erosion at the mating joint of the volute casing 2 and side liner 3.

Whilst the seal has been shown in the above embodiment as "J" shaped (this being deemed herein substantially "L" shaped), it is possible to utilise a strictly "L" shaped seal or other suitable shapes to accompany the project of the present invention. Further, the annular projection 23 could be located on the face 13 of the volute casing 2 with complementary recess located in the bottom of the "J" of the seal.

Further, the inner face 21 could be non-tapered while the outer face 9 is tapered to provide correct radial location. A further annular projection could be located on the opposite face of either the volute casing 2 or the side liner 3 to provide a double lock for the seal 8 which can be of any required shape.

Further, the present invention provides a joint which requires no machining on the mating faces, yet provides a liquid-tight seal at less cost than the existing prior art seal.

I claim:

1. An elastomeric casing seal which provides relative positioning between first and second casing parts as well as axial and radial sealing therebetween, the first casing part including a member having a wall or walls projecting therefrom, and the second casing part including a bore having a wall or walls extending from the opening of the bore, the walls of the second casing part terminating in a shoulder extending radially inward with respect to the bore, the walls of the first casing part mating within the bore of the second casing part; comprising:

a seal of substantially L-shaped cross-section, with the long arm of the L having at least one of its surfaces which slopes from its free end, which is narrower in width than the width of the base of the long arm, mating with an adjacent tapered face of one of the walls of the first and second casing parts and having the surface of the base of the L adapted to be located on the shoulder of the second casing part with the opposite surface of the base of the L facing the first casing part having a recess to receive a projection from the first casing part to axially locate that first casing part relative to the second casing part.

2. An elastomeric casing seal according to claim 1 wherein the sloping surface of the long arm of the L is its surface facing the first casing part and is adapted to mate with a tapered surface of the first casing part in use.

3. An elastomeric seal according to claim 2 wherein, in use, a portion of the seal which forms the free end of the base of the L slopes upwardly from the edge of the shoulder of the second casing part to abut against the first casing part.

4. An elastomeric casing seal according to claim 2 wherein the sloping surface of the long arm of the L is its surface facing the first casing part and is adapted to mate with a tapered surface of the first casing part in use.

5. An elastomeric seal according to claim 4 wherein, in use, a portion of the seal which forms the free end of the base of the L slopes upwardly from the edge of the shoulder of the second casing part to abut against the first casing part.

6. An elastomeric casing seal according to claim 1 wherein the sloping surface of the long arm of the L is its surface facing the first casing part and is adapted to mate with a tapered surface of the first casing part in use.

7. An elastomeric seal according to claim 6 wherein, in use, a portion of the seal which forms the free end of the base of the L slopes upwardly from the edge of the shoulder of the second casing part to abut against the first casing part.

8. An elastomeric casing seal according to claim 1 wherein the seal is annular.

9. An elastomeric casing seal according to claim 8 wherein the sloping surface of the long arm of the L is its surface facing the first casing part and is adapted to mate with a tapered surface of the first casing part in use.

10. An elastomeric seal according to claim 9 wherein, in use, a portion of the seal which forms the free end of the base of the L slopes upwardly from the edge of the shoulder of the second casing part to abut against the first casing part.

11. An elastomeric casing seal according to claim 1 wherein said sloping surface of said long arm of the L mates with an adjacent tapered surface of one of the walls of said first and second casing parts which faces a surface of one of the walls of the other of said first and second casing parts on the opposite surface of said long arm.

* * * * *